(12) United States Patent
Foroughi et al.

(10) Patent No.: US 10,546,054 B1
(45) Date of Patent: Jan. 28, 2020

(54) SYSTEM AND METHOD FOR SYNTHETIC FORM IMAGE GENERATION

(71) Applicants: Homa Foroughi, Edmonton (CA); Joy Rimchala, Mountain View, CA (US)

(72) Inventors: Homa Foroughi, Edmonton (CA); Joy Rimchala, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 15/908,792

(22) Filed: Feb. 28, 2018

(51) Int. Cl.
G06F 17/00 (2019.01)
G06F 17/24 (2006.01)
G06N 20/00 (2019.01)
G06F 16/28 (2019.01)

(52) U.S. Cl.
CPC .......... *G06F 17/243* (2013.01); *G06F 16/287* (2019.01); *G06N 20/00* (2019.01)

(58) Field of Classification Search
CPC ...... G06F 17/243; G06F 16/287; G06N 20/00
See application file for complete search history.

(56) References Cited

U.S. PATENT DOCUMENTS

| | | | | |
|---|---|---|---|---|
| 5,933,823 A * | 8/1999 | Cullen | ............... | G06K 9/00442 |
| 7,092,922 B2 * | 8/2006 | Meng | ...................... | G06N 3/08 |
| | | | | 706/16 |
| 7,254,569 B2 * | 8/2007 | Goodman | ............. | G06F 17/243 |
| 7,500,178 B1 * | 3/2009 | O'Donnell | ............ | G06F 17/243 |
| | | | | 715/221 |
| 8,756,489 B2 * | 6/2014 | Richardt | ............... | G06F 17/217 |
| | | | | 715/221 |
| 9,461,972 B1 * | 10/2016 | Mehta | ...................... | H04L 63/10 |
| 9,501,540 B2 * | 11/2016 | Parker | ................. | G06F 16/3344 |
| 2003/0026459 A1 * | 2/2003 | Won | ...................... | G06F 16/313 |
| | | | | 382/113 |

(Continued)

OTHER PUBLICATIONS

Max Jaderberg et al., "Synthetic Data and Artificial Neural Networks for Natural Scene Text Recognition", Dec. 9, 2014 (10 pages).

(Continued)

*Primary Examiner* — Stephen S Hong
*Assistant Examiner* — Marshon L Robinson
(74) *Attorney, Agent, or Firm* — Ferguson Braswell Fraser Kubasta PC

(57) ABSTRACT

A method and system for generating synthetic form image involves obtaining a multitude of field value data and associated field labels for a chosen type of form document from an electronic data source, classifying the multitude of field value data into a multitude of data categories, where the multitude of data categories, learning statistical data distributions for categorical and numerical data types using the classified categorical and numerical data, and sampling data elements randomly using the learned data distributions to generate synthetic data for categorical and numerical data. The method also involves assembling the synthetic data for the multitude of data categories with the associated field labels to generate a labeled synthetic textual data set, rendering the labeled synthetic textual data set over a structured form layout image to produce a synthetic form image, and storing the synthetic form image and the labeled synthetic textual data set.

20 Claims, 11 Drawing Sheets
(7 of 11 Drawing Sheet(s) Filed in Color)

(56) References Cited

U.S. PATENT DOCUMENTS

| | | | | |
|---|---|---|---|---|
| 2005/0033709 A1* | 2/2005 | Meng | | G06N 3/08 706/25 |
| 2005/0125746 A1* | 6/2005 | Viola | | G06F 16/93 715/853 |
| 2006/0020492 A1* | 1/2006 | Cousineau | | G06F 17/278 705/2 |
| 2006/0020493 A1* | 1/2006 | Cousineau | | G06Q 50/22 705/2 |
| 2006/0184870 A1* | 8/2006 | Christen | | G06F 17/2247 715/201 |
| 2008/0147528 A1* | 6/2008 | Talan | | G06F 17/243 705/31 |
| 2008/0154824 A1* | 6/2008 | Weir | | G06N 7/005 706/45 |
| 2009/0018990 A1* | 1/2009 | Moraleda | | G06K 9/00463 |
| 2009/0116736 A1* | 5/2009 | Neogi | | G06K 9/00442 382/159 |
| 2009/0327513 A1* | 12/2009 | Guo | | G06F 17/243 709/232 |
| 2010/0220343 A1* | 9/2010 | Horikawa | | G06T 11/60 358/1.11 |
| 2010/0317420 A1* | 12/2010 | Hoffberg | | G06Q 30/0207 463/1 |
| 2013/0013612 A1* | 1/2013 | Fittges | | G06F 16/353 707/739 |
| 2013/0218872 A1* | 8/2013 | Jehuda | | G06F 16/951 707/722 |
| 2013/0318426 A1* | 11/2013 | Shu | | G06F 17/243 715/226 |
| 2014/0133767 A1* | 5/2014 | Lund | | G06K 9/38 382/229 |
| 2014/0223277 A1* | 8/2014 | Kimber | | G06F 17/243 715/223 |
| 2014/0237342 A1* | 8/2014 | King | | G06F 16/955 715/224 |
| 2014/0258825 A1* | 9/2014 | Ghosh | | G06F 17/243 715/222 |
| 2015/0046785 A1* | 2/2015 | Byron | | G06F 17/245 715/227 |
| 2015/0095753 A1* | 4/2015 | Gajera | | G06F 17/243 715/226 |
| 2015/0310005 A1* | 10/2015 | Ryger | | G06F 16/93 707/706 |
| 2015/0312183 A1* | 10/2015 | Hu | | H04L 51/08 715/752 |
| 2016/0019197 A1* | 1/2016 | Iasi | | G06F 17/243 715/224 |
| 2016/0062972 A1* | 3/2016 | Ramakrishnan | | G06F 17/243 715/226 |
| 2016/0253504 A1* | 9/2016 | Chen | | G06K 9/18 726/28 |
| 2017/0017899 A1* | 1/2017 | Maor | | G06N 20/00 |
| 2017/0075873 A1* | 3/2017 | Shetty | | G06F 17/243 |
| 2017/0263019 A1* | 9/2017 | Song | | G06T 11/00 |
| 2017/0277775 A1* | 9/2017 | Eigner | | G06F 17/2205 |
| 2018/0101791 A1* | 4/2018 | Viswanathan | | G06N 20/00 |
| 2019/0026550 A1* | 1/2019 | Yang | | G06K 9/00463 |
| 2019/0073348 A1* | 3/2019 | Cheesman | | G06K 9/00449 |
| 2019/0108277 A1* | 4/2019 | Taneja | | G06F 17/2247 |

OTHER PUBLICATIONS

Ankush Gupta et al., "Synthetic Data for Text Localisation in Natural Images", Apr. 22, 2016 (14 pages).
Sheraz Ahmed et al., "A Generic Method for Automatic Ground Truth Generation of Camera-captured Documents", May 4, 2016 (15 pages).
Samuele Capobianco et al., "DocEmul: a Toolkit to Generate Structured Historical Documents", Oct. 10, 2017 (6 pages).

* cited by examiner

SYSTEM AND METHOD FOR SYNTHETIC FORM IMAGE GENERATION

BACKGROUND

It is becoming a fast-growing trend to allow customers to upload form document images (rather than editable documents) as a way to input data into software products; thereby eliminating manual data entry. For machine learning algorithm to process and understand the content of the form document images, a large amount of high quality labeled data for known form images is needed to train the software. Acquiring such labeled data for form images is expensive because the data requires a human involved with verification and manual field level redaction because of the sensitive nature of some fields.

To date, research and development related to synthetic data generation is mostly at character or word level. Previous work on synthetic document data generation cannot synthesize numerical valued data which constitutes more than 50% of the field values in some form documents, such as tax forms, invoices, receipts, or other complex forms. A lack of work exists in synthetic data generation geared towards form document images. Specifically (and importantly), synthetic form image generation that considers the dependency of different fields and provides form field labels required for information extraction from forms is desirable.

SUMMARY

In general, in one aspect, one or more embodiments relate to a method for generating synthetic form image that includes obtaining a plurality of field value data and associated field labels for a chosen type of form document from an electronic data source; classifying the plurality of field value data into a plurality of data categories, wherein the plurality of data categories comprise at least one from a group consisting of personally identifiable information, categorical data, and numerical data; learning statistical data distributions for categorical and numerical data types using the classified categorical and numerical data; and sampling data elements randomly using the learned data distributions to generate synthetic data for categorical and numerical data. The method also includes assembling the synthetic data for the plurality of data categories with the associated field labels to generate a labeled synthetic textual data set; rendering the labeled synthetic textual data set over a structured form layout image to produce a synthetic form image; and storing the synthetic form image and the labeled synthetic textual data set.

In general, in one aspect, one or more embodiments relate to a system that includes a computer processor; a field value data type repository configured to store a plurality of field value data types comprising personally identifiable information data type, categorical data type, and numerical data type; a synthetic data repository configured to store labeled synthetic data sets from the plurality of field value data types, and synthetic form images; and a synthetic data generation pipeline executing on the cloud computing platform and computer processor. Additionally, the synthetic data generation pipeline includes functionalities to obtain the plurality of field value data and associated field labels for a chosen type of form document from an electronic data source; classify the plurality of field value data into a plurality of data categories, wherein the plurality of data categories comprise at least one from a group consisting of personally identifiable information, categorical data, and continuous data; learn statistical data distributions for categorical and numerical data types using the classified categorical and numerical data; and sample data elements randomly using the learned data distributions to generate synthetic data for categorical and numerical data. The synthetic data generation pipeline also includes functionalities to assemble the synthetic data for the plurality of data categories with the associated field labels to generate a labeled synthetic textual data set; render the labeled synthetic textual data set over a structured form layout image to produce a synthetic form image; and store the synthetic form image and the labeled synthetic textual data set.

In general, in one aspect, one or more embodiments relate to a non-transitory computer readable medium including computer readable program code for causing a computer system to obtain a plurality of field value data and associated field labels for a chosen type of form document from an electronic data source; classify the plurality of field value data into a plurality of data categories, wherein the plurality of data categories comprise at least one from a group consisting of personally identifiable information, categorical data, and continuous data; learn statistical data distributions for categorical and numerical data types using the classified categorical and numerical data; sample data elements randomly using the learned data distributions to generate synthetic data for categorical and numerical data; assemble the synthetic data for the plurality of data categories with the associated field labels to generate a labeled synthetic textual data set; render the labeled synthetic textual data set over a structured form layout image to produce a synthetic form image; and store the synthetic form image and the labeled synthetic textual data set for future use as training data for machine learning algorithms.

Other aspects of the invention will be apparent from the following description and the appended claims.

BRIEF DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
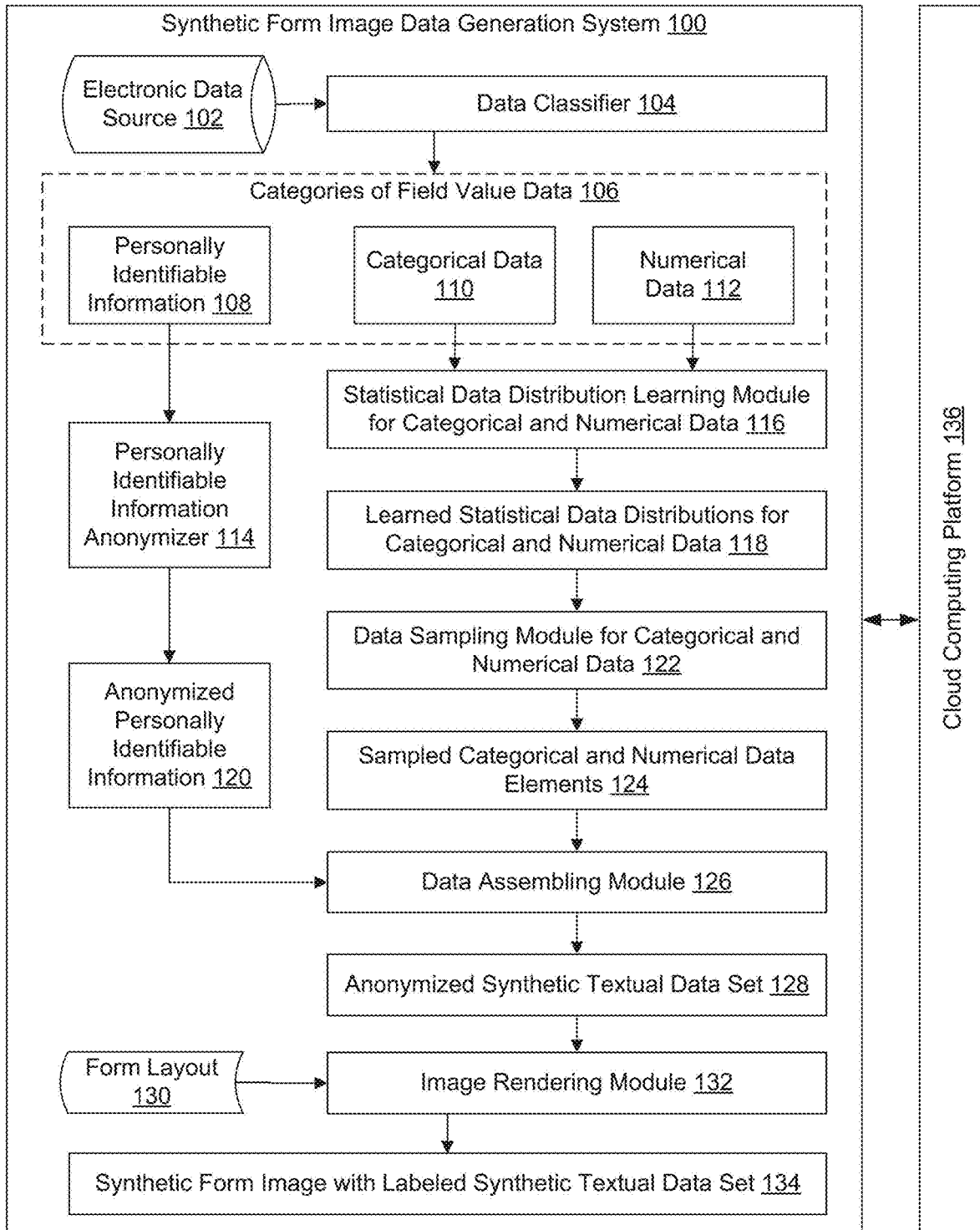
FIG. 1 depicts a schematic system diagram in accordance with one or more embodiments.

Specific embodiments will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or proceed) the second element in an ordering of elements.

Further, although the description includes a discussion of various embodiments of the invention, the various disclosed embodiments may be combined in virtually any manner. All combinations are contemplated herein.

In general, embodiments of the invention are directed to generating synthetic form image data by learning statistical distributions of real data. In other words, one or more embodiments are directed to learning the statistical data distributions of real electronic record data or labeled data from real form images, and then these statistical distributions are used to generate large amount of synthetic textual data sets. One or more embodiments also deal with combination of multiple data types including non-traceable Personally Identifiable Information. Further, one or more embodiments are directed to rendering the synthetic textual data sets on a form layout to generate synthetic form images.

FIG. 1 is a schematic diagram showing a system for generating synthetic form image data (100), in accordance with one or more embodiments. As depicted, an electronic data source (102) and a form layout (130) serve as the inputs of the system (100), and the output is a synthetic form image with labeled synthetic textual data set (134). This synthetic form image with labeled synthetic textual data set serves as the training data for any machine learning algorithms for information extraction from real form images.

The system (100) is hosted on a computing system, such as the cloud computing platform (136).

In one or more embodiments, the system for generating synthetic form image data (100) includes a data classifier (104), a Personally Identifiable Information anonymizer (114), a statistical data distribution learning module for categorical and numerical data (116), a data sampling module for categorical and numerical data (122), a data assembling module (126), and an image rendering module (132).

In one or more embodiments, the data classifier (104) accepts input data from the electronic data source (102), and produces categories of field value data (106) as the output. The categories of field value data (106) include Personally Identifiable Information (PII) (108), categorical data (110), and numerical data (112). PII is any information that can be used to distinguish or trace an individual's identity. For example, on a W-2 form, the employee's social security number, the employee's name and address, and the employer identification number, etc. are PII. The employee's wages, federal income tax withheld, and state income tax, etc. are numerical data. The abbreviation for a state, and the control number, etc. are categorical data.

In one or more embodiments, the Personally Identifiable Information anonymizer (114) takes the Personally Identifiable Information (108) as the input, and output anonymized Personally Identifiable Information (120), which in turn serves as one of the inputs of the data assembling module (126).

In one or more embodiments, the statistical data distribution learning module for categorical and numerical data (116) uses the categorical data (110) and numerical data (112) as input, and generates learned statistical data distributions for categorical and numerical data (118) as results.

In one or more embodiments, the data sampling module (122) uses the learned data distributions for categorical or numerical data (118) as input, and generates sampled categorical and numerical data elements (124) as output.

In one or more embodiments, the data assembling module (126) combines the sampled categorical and numerical data elements (124) and the anonymized Personally Identifiable Information (120) to generate an anonymized synthetic textual data set (128). Therefore, the anonymized synthetic textual data set contains the anonymized Personally Identifiable Information, synthetic categorical data elements, and synthetic numerical data elements.

In one or more embodiments of the invention, the image rendering module (132) takes the anonymized synthetic textual data set (128) and the form layout (130) as input, and outputs a synthetic form image with synthetic field value data (134).

Figure 2:
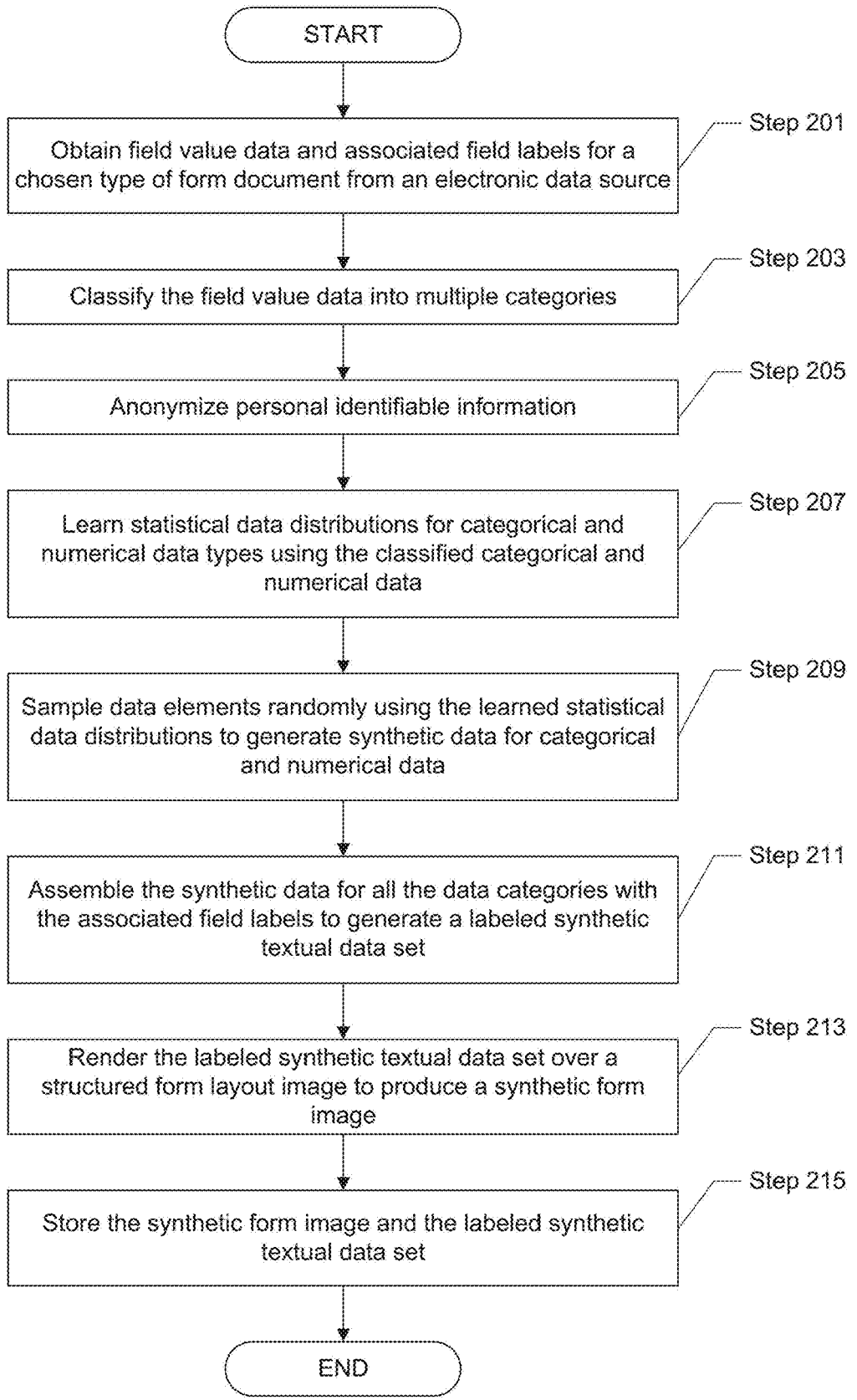
FIG. 2 depicts flowchart diagrams in accordance with one or more embodiments.

FIG. 2 is a flowchart diagram of a process for generating synthetic form image data, in accordance with one or more embodiments. In one or more embodiments, one or more of the operations shown in FIG. 2 may be performed on a cloud computing platform (136) or other scalable computing services, such as Amazon Web Services (AWS). The computing platform allows the system for generating synthetic form image data (100) to execute on a full-fledged virtual cluster of computers, available all the time, accessible through the Internet.

In Step 201, the field value data and the associated field labels for a chosen type of form documents are obtained from an electronic data source. The data source may be real electronic record data and/or labeled data from real images. For example, for a W-2 tax document, the data source may be real electronically-filed W-2 data and/or labeled W-2 data from real W-2 form images. In one or more embodiments of the invention, the types of form document may include, but not limited to W-2 forms, 1099 forms, invoices, expense forms, and receipts, etc.

In Step 203, the field value data is classified into multiple categories including Personally Identifiable Information, categorical data, and numerical data. At first, the field value is mapped to the field label, then the data category of the field value data is identified.

Figure 3:
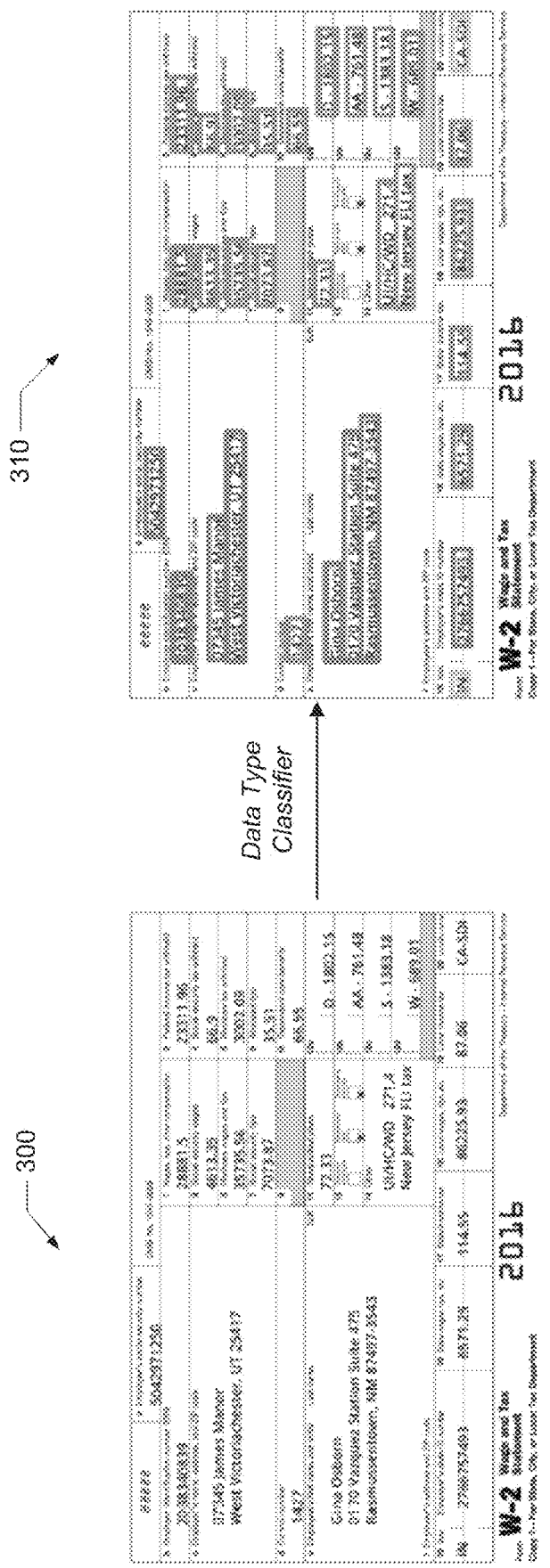
FIG. 3 depicts a view of form images in accordance with one or more embodiments.

FIG. 3 depicts an example of data type classification, in accordance with one or more embodiments. In this example, A W-2 Wage and Tax Statement form that contains textual data (300) is input through a data type classifier, and the individual fields are classified into multiple categories outlined in different colors (e.g., red, green, blue, and orange) (310) on the W-2 form. In this example, the fields outlined in red are Personally Identifiable Information, the fields outlined in green are numerical values, and the fields outlined in blue and orange are two different types of categorical values.

In Step 205, the Personally Identifiable Information is anonymized by a Personally Identifiable Information Anonymizer package (open-source python library), and thus the synthetic anonymized Personally Identifiable Information contains non-traceable Personally Identifiable Information. The Personally Identifiable Information Anonymizer package may be obtained through open source, and allows users to quickly and anonymize data containing Personally Identifiable Information. Step 205 improves privacy of the data, which is important in many industries, including the financial and medical industries.

In Step 207, the statistical data distributions are learned for the categorical and numerical data types using the classified categorical and numerical data.

Figure 4A:
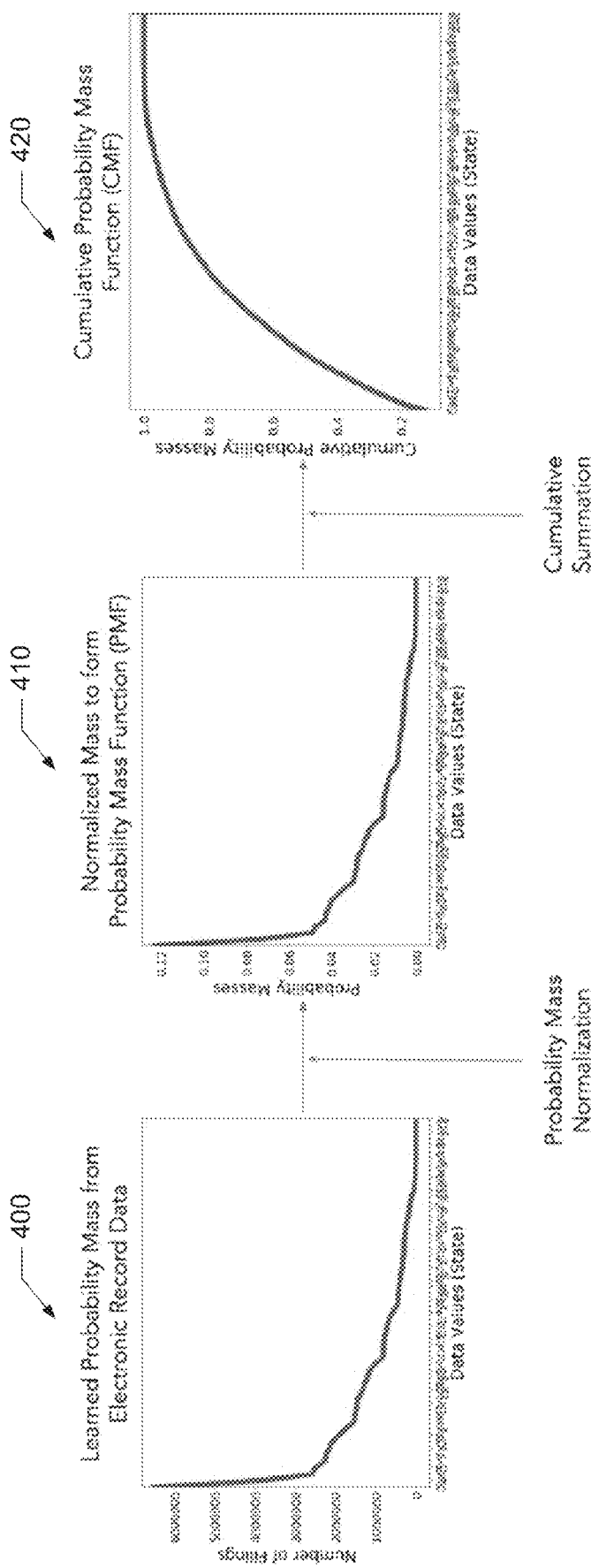
FIG. 4A and FIG. 4B depict graph views in accordance with one or more embodiments.

FIG. 4A contains graph views that depict the process of learning statistical data distribution for categorical data by way of an example, in accordance with one or more embodiments. In this example, the abbreviations of states are used as the categorical data. At first, a probability mass is computed from the categorical data obtained through data type classification from electronic tax filing record data (400). The probability mass is defined as the frequency of a particular categorical data, and in this example, it is the number of tax filings in a specified state. The frequency computation is followed by a frequency-based bin ranking. Then, the probability mass is normalized to obtain Probability Mass Function (PMF) (410). Further, the Cumulative Probability Mass Function (CMF) is computed from the Probability Mass Function (PMF) (420).

Figure 4B:
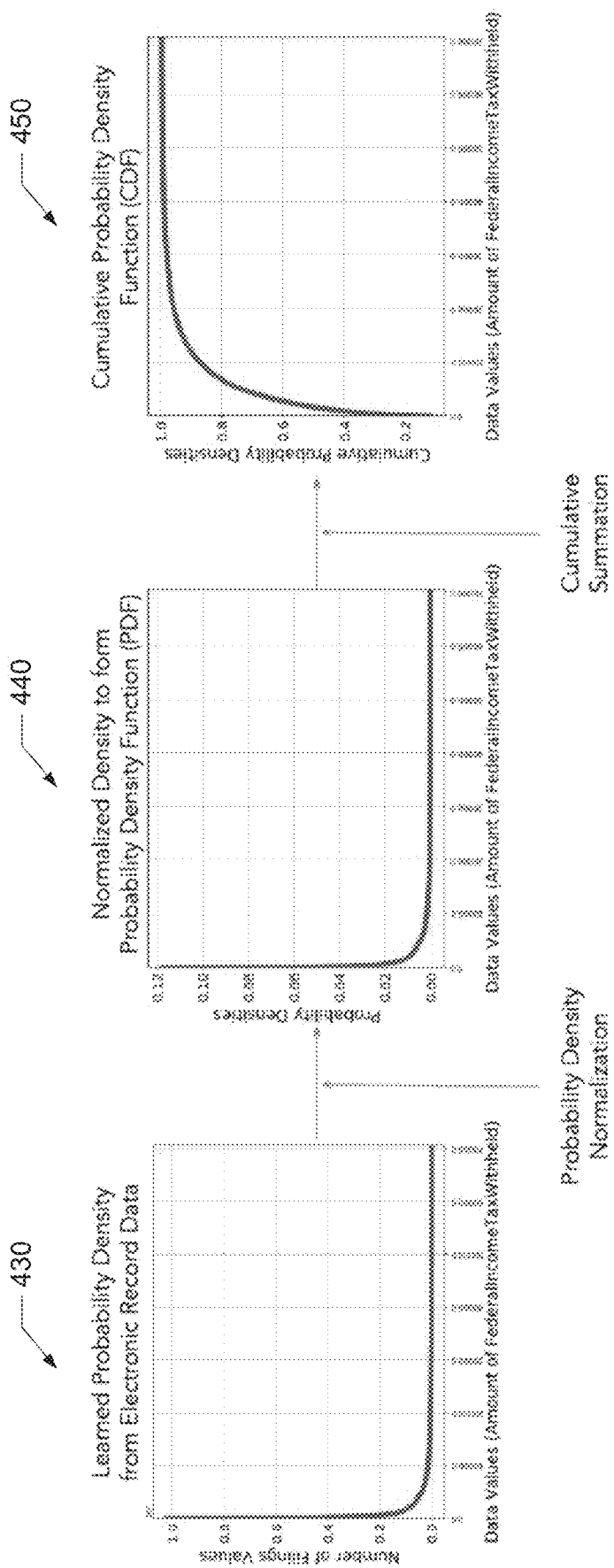

FIG. 4B contains graph views that depict the process of learning statistical data distribution for numerical data by way of an example, in accordance with one or more embodiments. In this example, the amount of federal income tax withheld is used as the numerical data. At first, the probability density is computed from the numerical data obtained through data type classification from electronic tax filing record data (430). The probability density is defined as the percentage of tax filings for a specified amount of federal income tax withheld. Then, the probability density is normalized to obtain Probability Density Function (PDF) (440). Further, the Cumulative Probability Density Function (CDF) is computed from the Probability Density Function (PDF) (450).

In Step 209, the data elements are sampled randomly using the learned statistical data distributions to generate synthetic data for categorical and numerical data. Stratified sampling is used to sample from the frequency-ranked Cumulative Probability Mass Function (CMF) which is the learned data distribution for categorical data to generate synthetic data for categorical data. Stratified sampling is also used to sample from the percentile-reconstructed Cumulative Probability Density Function (CDF) which is the learned data distribution for numerical data to generate synthetic data for numerical data.

Figure 5A:
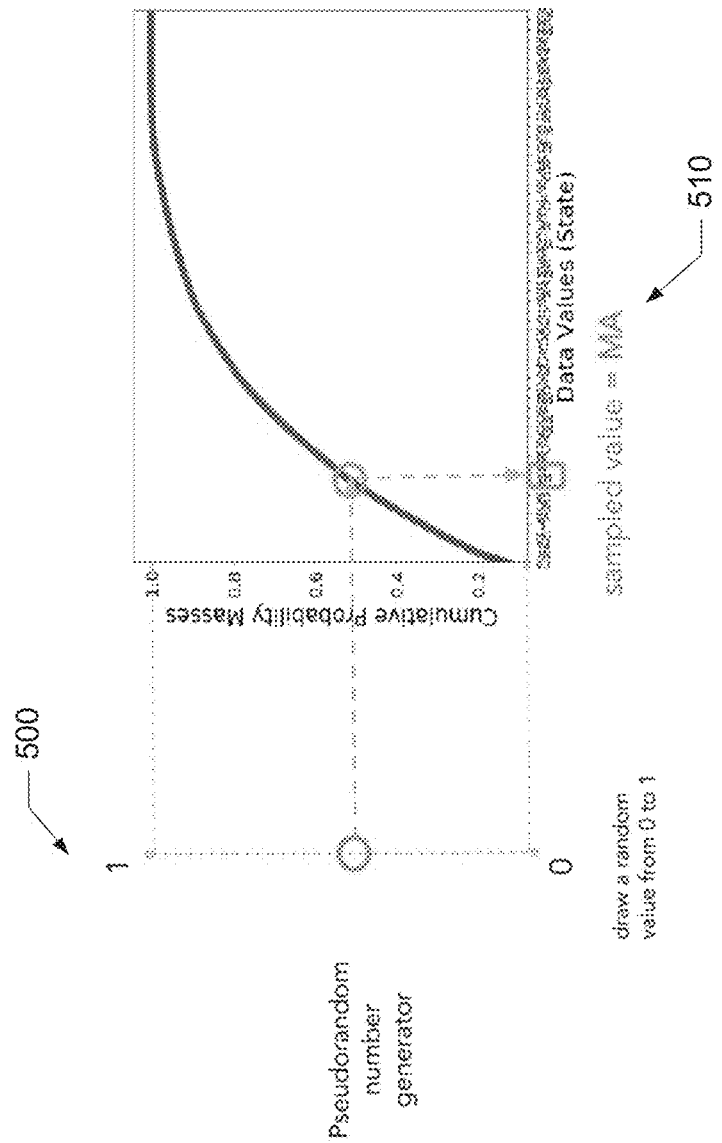
FIG. 5A and FIG. 5B depict graph views in accordance with one or more embodiments.

FIG. 5A is a graph view that depicts the categorical data sampling from the learned discrete-valued distributions, i.e., Cumulative Probability Mass Function (CMF), by way of an example, in accordance with one or more embodiments. In this example, the abbreviations of states are used as the categorical data. At first, a random number between (0, 1) is drawn by a Pseudorandom Number Generator (500). Then, according to the Cumulative Probability Mass Function, the abbreviation of a state is found for this random number. For example, for the random number 0.5, the abbreviation of a state is found as "MA" (510), and thus the categorical data "MA" is sampled for the associated field label "State".

Figure 5B:
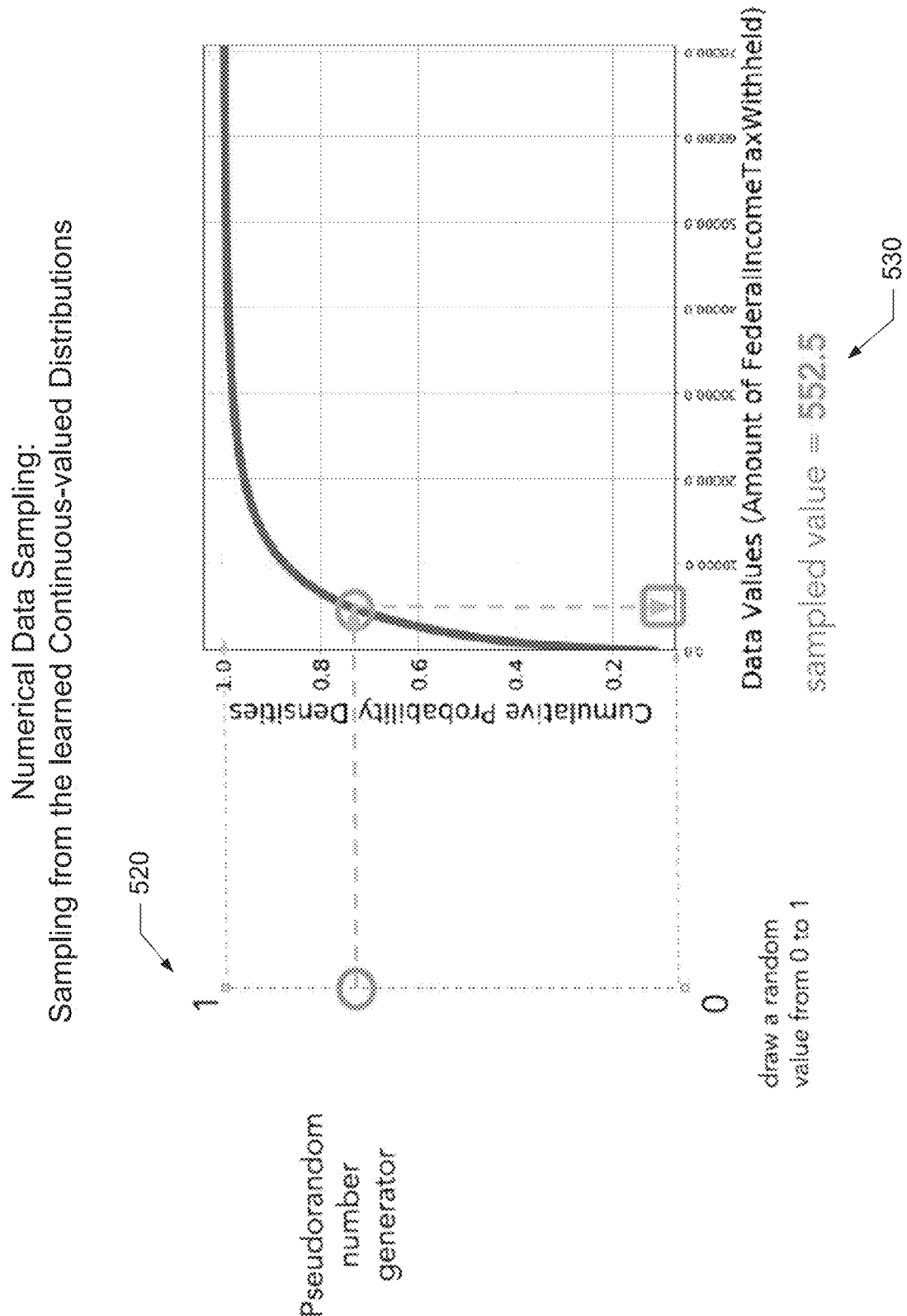

FIG. 5B is a graph view that depicts the numerical data sampling from the learned continuous-valued distributions, i.e., Cumulative Probability Density Function (CDF), by way of an example, in accordance with one or more embodiments. In this example, the amount of federal income tax withheld is used as the numerical data. At first, a random number between (0, 1) is drawn by a Pseudorandom Number Generator (520). Then, according to the Cumulative Probability Density Function, the amount of federal income tax withheld is found for this random number. For example, for the random number 0.75, the amount of federal income tax withheld is found as "552.5" (530), and thus the numerical data "552.5" is sampled for the associated field label "Federal Income Tax Withheld".

Figure 6:
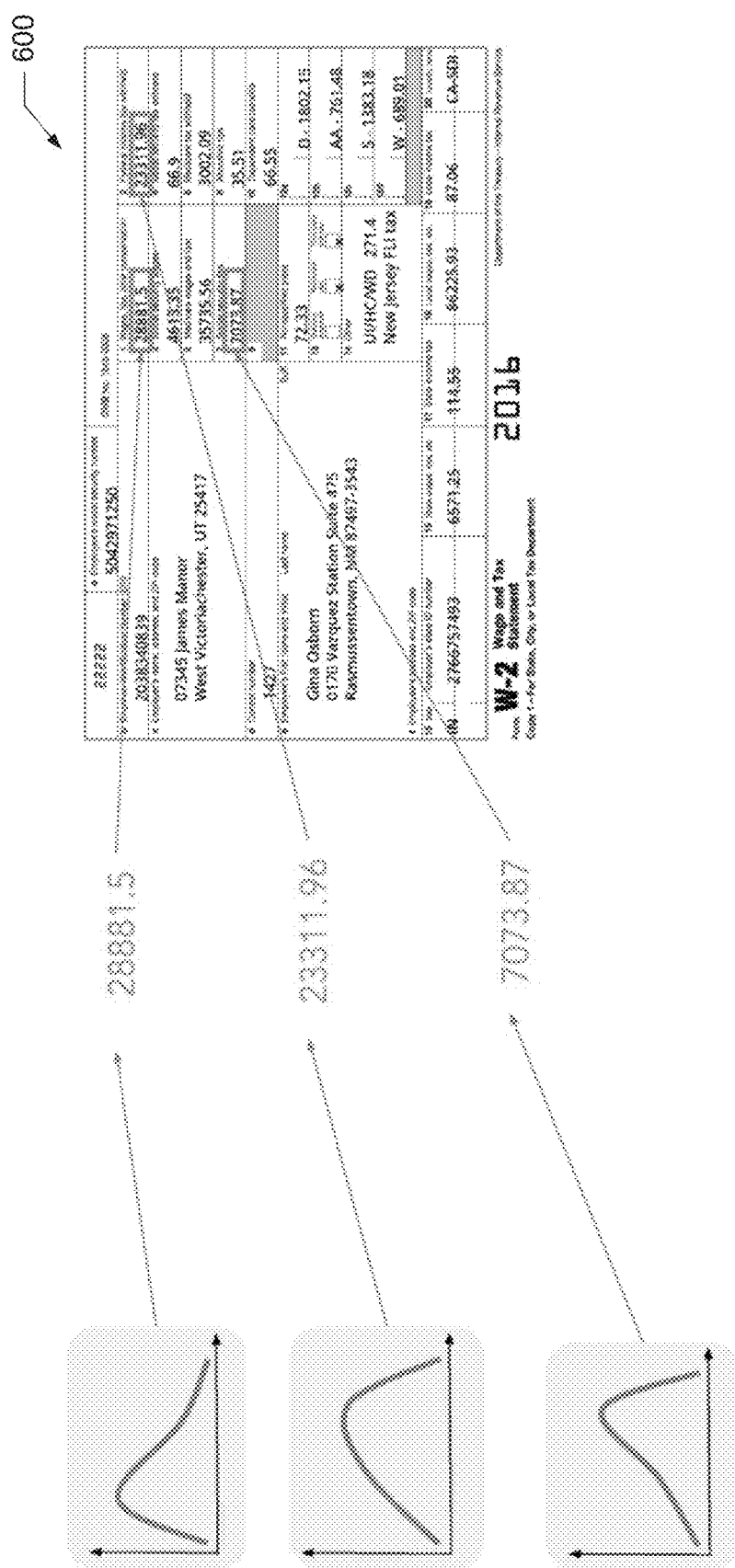
FIG. 6 depicts graph views in accordance with one or more embodiments.

In Step 211, the synthetic data for all the data categories are assembled with the associated field labels to generate a labeled synthetic textual data set. FIG. 6 is a graph view that depicts the process of data assembling that combine the sampled field data values into textual form data (600), in accordance with one or more embodiments.

In Step 213, the labeled synthetic textual data set is rendered over a structured form layout image to produce a synthetic form image. In one or more embodiments of the invention, the structured form layout image is clean and empty, i.e., the image contains no data. This layout has been prepared by human and stored online Each type of form documents may have many different layouts. For example, the layouts (i.e. templates) of W-2 currently used in the US include the ones for current and previous years, and for different employers, etc. Currently, about 50 different layouts exist that are stored in the system and any of the layouts may be chosen randomly.

In one or more embodiments of the invention, Step 213 is typically implemented in three steps. At first, the labeled synthetic textual data sets are obtained from the data assembler, and a structured layout image is obtained from a search, such as Amazon Web Services Elastic Search. Then, random available text fonts and styles are chosen from a library of available text fonts. Further, the labeled synthetical textual data set is rendered over the structured layout image. The OpenCV Python package may be used as the image rendering engine.

In one or more embodiments of the invention, it is important to have the synthetical textual data labeled because the labels along with the synthetical textual data can serve as training data sets for any supervised machine learning algorithms for information extraction from real form images.

Figure 7:
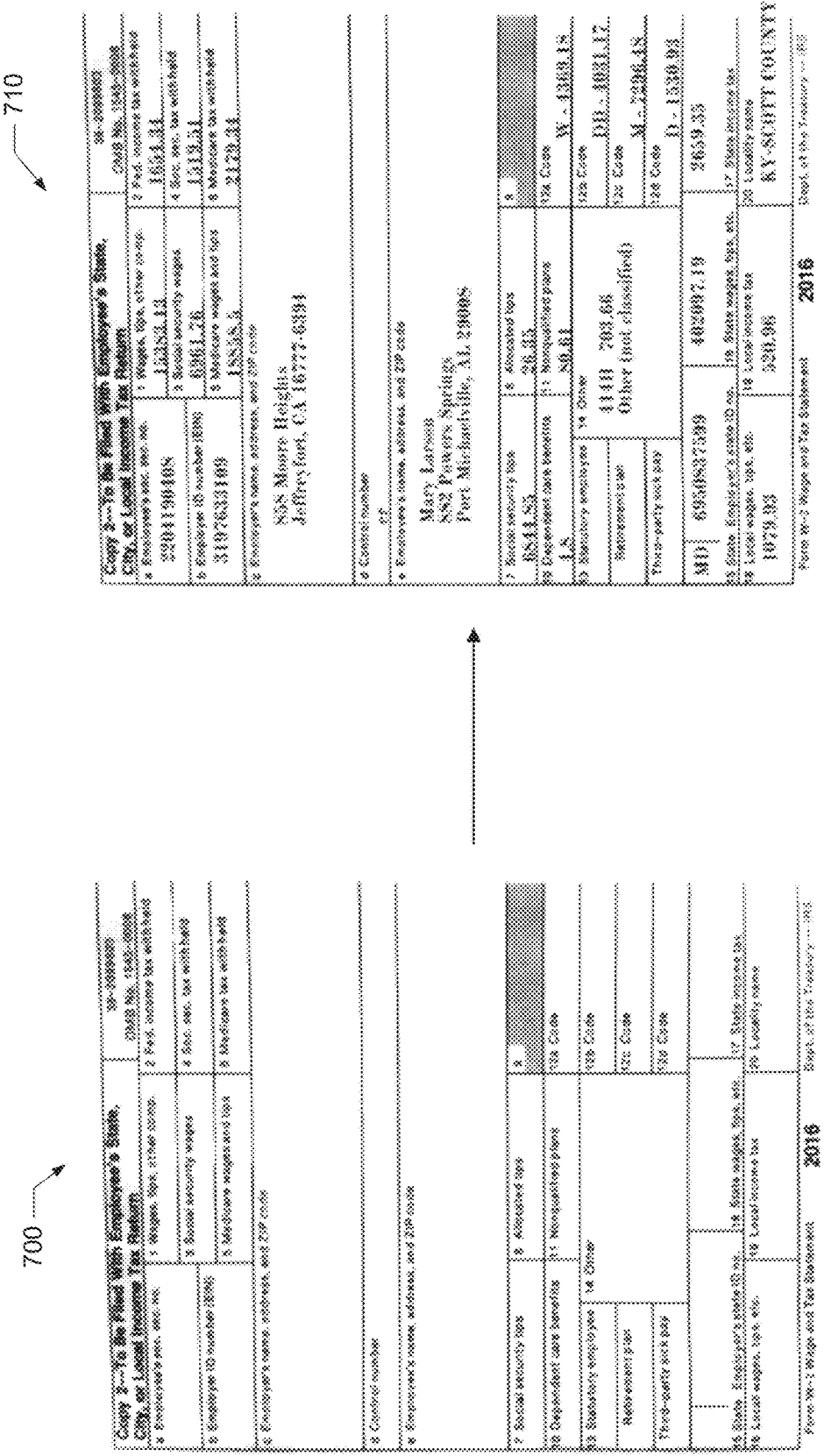
FIG. 7 depicts views of form images in accordance with one or more embodiments.

FIG. 7 depicts views of example form images before and after image rendering, in accordance with one or more embodiments. The input is a form layout image (700). The output is a rendered image (710) with the textual data correctly placed in the associated fields. In one or more embodiments, the layout images for one type of document may have many different versions. For example, the W-2 form may vary from year to year, from one payroll service to another, and from one employer to another, etc.

In Step 215, the synthetic form image and the labeled synthetic textual data set are stored on the Cloud Computing Platform (136) for future use. For example, they can be served as the training data for machine learning algorithm in information extraction from real form images.

In one or more embodiments of the invention, the system for generation of synthetic form images is scalable. For example, it can scale up the training set size for supervised machine learning models by several thousands of folds in a matter of hours. The cloud computing platform such as Amazon Web Services provides large scale computing capacity.

In one or more embodiments of the invention, the system for generation of synthetic form images is reconfigurable.

The system may be adapted to any form document types, such as W-2 forms, 1099 forms, invoices, receipts, expense forms, etc.

The following use cases are for explanatory purposes only and not intended to limit the scope of the invention.

Figure 8:
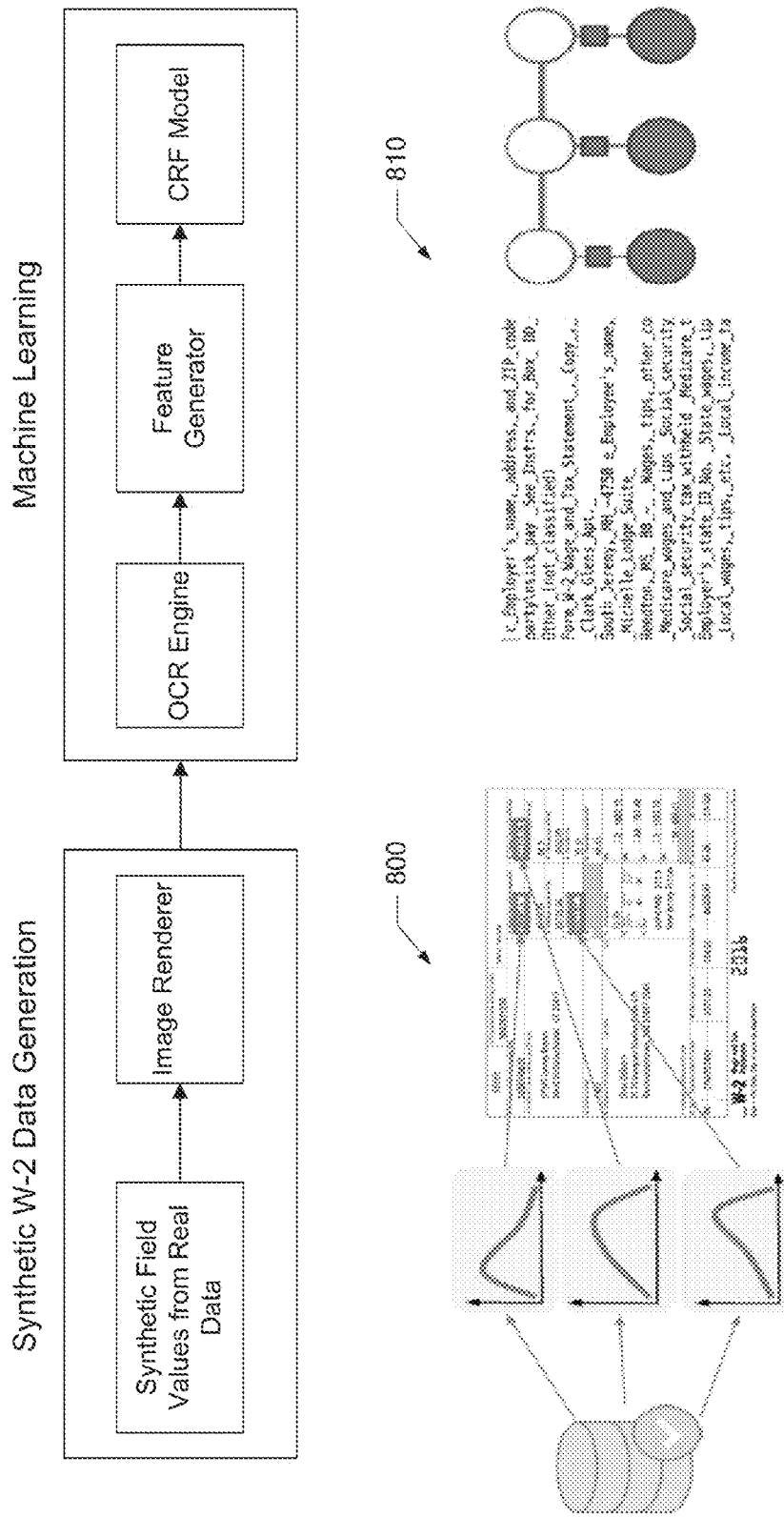
FIG. 8 depicts a diagram and graph views in accordance with one or more embodiments.

FIG. 8 depicts a successful use case, in accordance with one or more embodiments. A large amount of synthetic W-2 forms (800) are generated and used as training data sets for a supervised information extraction model and field type from real W-2 images. As a result, the information (810) from the real W-2 form images is extracted correctly.

Figure 9A:
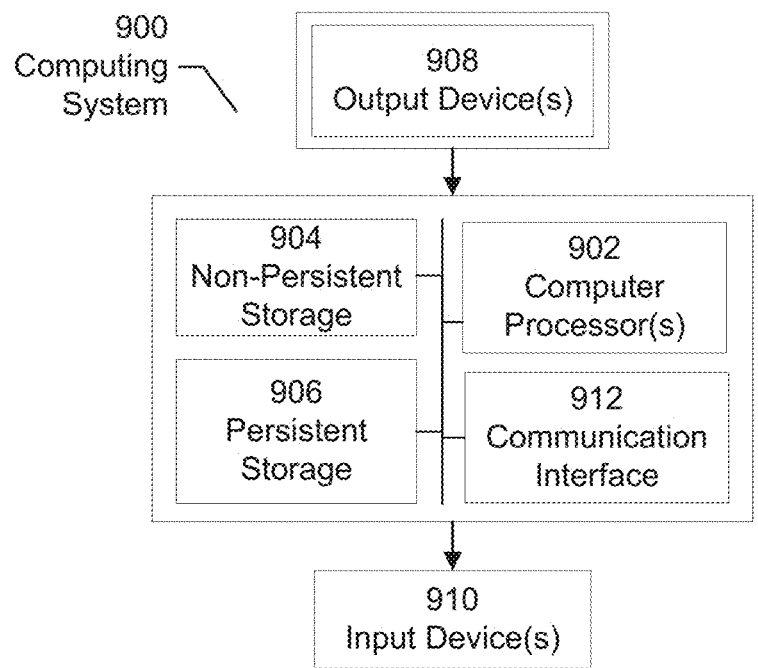
FIG. 9A and FIG. 9B depict diagrams showing a computing system, in accordance with one or more embodiments.

Embodiments of the invention may be implemented on a computing system. Any combination of mobile, desktop, server, router, switch, embedded device, or other types of hardware may be used. For example, as shown in FIG. 9A, the computing system (900) may include one or more computer processors (902), non-persistent storage (904) (e.g., volatile memory, such as random access memory (RAM), cache memory), persistent storage (906) (e.g., a hard disk, an optical drive such as a compact disk (CD) drive or digital versatile disk (DVD) drive, a flash memory, etc.), a communication interface (912) (e.g., Bluetooth interface, infrared interface, network interface, optical interface, etc.), and numerous other elements and functionalities.

The computer processor(s) (902) may be an integrated circuit for processing instructions. For example, the computer processor(s) may be one or more cores or micro-cores of a processor. The computing system (900) may also include one or more input devices (910), such as a touchscreen, keyboard, mouse, microphone, touchpad, electronic pen, or any other type of input device.

The communication interface (912) may include an integrated circuit for connecting the computing system (900) to a network (not shown) (e.g., a local area network (LAN), a wide area network (WAN) such as the Internet, mobile network, or any other type of network) and/or to another device, such as another computing device.

Further, the computing system (900) may include one or more output devices (908), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (902), non-persistent storage (904), and persistent storage (906). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 9B:
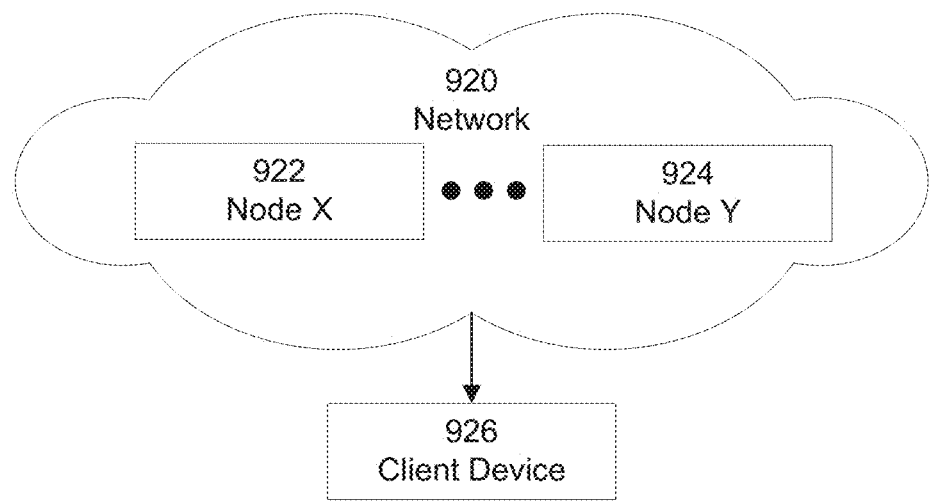

The computing system (900) in FIG. 9A may be connected to or be a part of a network. For example, as shown in FIG. 9B, the network (920) may include multiple nodes (e.g., node X (922), node Y (924)). Each node may correspond to a computing system, such as the computing system shown in FIG. 9A, or a group of nodes combined may correspond to the computing system shown in FIG. 9A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (900) may be located at a remote location and connected to the other elements over a network.

Although not shown in FIG. 9B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (922), node Y (924)) in the network (920) may be configured to provide services for a client device (926). For example, the nodes may be part of a cloud computing system. The nodes may include functionality to receive requests from the client device (926) and transmit responses to the client device (926). The client device (926) may be a computing system, such as the computing system shown in FIG. 9A. Further, the client device (926) may include and/or perform all or a portion of one or more embodiments of the invention.

The computing system or group of computing systems described in FIGS. 9A and 9B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 9A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 9A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 9A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 9A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 9A and the nodes and/or client device in FIG. 9B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating a synthetic form image comprising:
   obtaining a plurality of field value data and associated field labels for a chosen type of form document from an electronic data source;
   classifying the plurality of field value data into a plurality of data categories, wherein the plurality of data categories comprises at least one from a group consisting of personally identifiable information, categorical data, and numerical data;
   learning statistical data distributions for categorical and numerical data types using the classified categorical and numerical data;
   sampling data elements randomly using the learned data distributions to generate synthetic data for categorical and numerical data;
   assembling the synthetic data for the plurality of data categories with the associated field labels to generate a labeled synthetic textual data set;
   rendering the labeled synthetic textual data set over a structured form layout image to produce the synthetic form image by:
      obtaining synthetic textual datasets from a data assembler;
      obtaining the structured form layout image;
      choosing random available text fonts and styles from a library of available text fonts; and
      rendering the labeled synthetic textual data set over the structured form layout image using an image rendering engine to produce the synthetic form image; and
   storing the synthetic form image and the labeled synthetic textual data set.

2. The method of claim 1, wherein the types of form document comprise at least one from a group consisting of W-2 forms, 1099 forms, invoices, expense forms, and receipts.

3. The method of claim 1, wherein each form document type comprises a plurality of layout images.

4. The method of claim 1, wherein the synthetic form image and the labeled synthetic textual data set is stored for future use as training data for machine learning algorithms.

5. The method of claim 1, wherein the plurality of field value data comprises real electronic record data and labeled data from real form images.

6. The method of claim 1, wherein classifying the plurality of field value data into a plurality of data categories comprises:
   mapping the plurality of field value data to the associated field labels; and
   identifying the data category to which the plurality of field value data belongs.

7. The method of claim 1, wherein the personally identifiable information is anonymized by a personally identifiable information anonymizer package, and the anonymized personally identifiable information comprises non-traceable personally identifiable information.

8. The method of claim 1, wherein learning statistical data distribution for the categorical data comprises:
   obtaining categorical data from the classified data;

learning probability mass from the categorical data by frequency computation followed by frequency-based bin ranking;

normalizing the probability mass to obtain Probability Mass Function (PMF); and computing Cumulative Probability Mass Function (CMF) from the Probability Mass Function (PMF).

9. The method of claim 1, wherein learning statistical data distribution for the numerical data comprises:

obtaining numerical data from the classified data;

learning probability density from the numerical data by percentile computation;

normalizing the probability density to obtain Probability Density Function (PDF); and computing Cumulative Probability Density Function (CDF) from the Probability Density Function (PDF).

10. The method of claim 1, wherein sampling data elements randomly using learned statistical data distribution for the categorical data type comprises stratified sampling from the Cumulative Probability Mass Function (CMF).

11. The method of claim 1, wherein sampling data elements randomly using learned statistical data distribution for the numerical data type comprises stratified sampling from the Cumulative Probability Density Function (CDF).

12. The method of claim 1, wherein the labeled synthetic textual data set comprises the synthetic textual data for all data categories and the associated field labels.

13. A system for generating synthetic data comprising:

a computer processor;

a field value data type repository configured to store:
  a plurality of field value data types comprising personally identifiable information data type, categorical data type, and numerical data type;

a synthetic data repository configured to store:
  labeled synthetic data sets from the plurality of field value data types, and synthetic form images; and a synthetic data generation pipeline executing on the cloud computing platform and computer processor and configured to:
  obtain the plurality of field value data and associated field labels for a chosen type of form document from an electronic data source,
  classify the plurality of field value data into a plurality of data categories, wherein the plurality of data categories comprises at least one from a group consisting of personally identifiable information, categorical data, and continuous data,
  learn statistical data distributions for categorical and numerical data types using the classified categorical and numerical data,
  sample data elements randomly using the learned data distributions to generate synthetic data for categorical and numerical data,
  assemble the synthetic data for the plurality of data categories with the associated field labels to generate a labeled synthetic textual data set,
  render the labeled synthetic textual data set over a structured form layout image to produce a synthetic form image by:
    obtaining synthetic textual datasets from a data assembler;
    obtaining the structured form layout image;
    choosing random available text fonts and styles from a library of available text fonts; and
    rendering the labeled synthetic textual data set over the structured form layout image using an image rendering engine to produce the synthetic form image, and
  store the synthetic form image and the labeled synthetic textual data set.

14. The system of claim 13, wherein learning statistical data distribution for the categorical data comprises:

obtaining categorical data from the classified data;

learning probability mass from the categorical data by frequency computation followed by frequency-based bin ranking;

normalizing the probability mass to obtain Probability Mass Function (PMF); and computing Cumulative Probability Mass Function (CMF) from the Probability Mass Function (PMF).

15. The system of claim 13, wherein the synthetic form image and the labeled synthetic textual data set is stored for future use as training data for machine learning algorithms.

16. The system of claim 13, wherein learning statistical data distribution for the numerical data comprises:

obtaining numerical data from the classified data;

learning probability density from the numerical data by percentile computation;

normalizing the probability density to obtain Probability Density Function (PDF); and computing Cumulative Probability Density Function (CDF) from the Probability Density Function (PDF).

17. The system of claim 13, wherein sampling data elements randomly using learned statistical data distribution for the categorical data type comprises stratified sampling from the Cumulative Probability Mass Function (CMF).

18. The system of claim 13, wherein sampling data elements randomly using learned statistical data distribution for the numerical data type comprises stratified sampling from the Cumulative Probability Density Function (CDF).

19. A non-transitory computer readable medium comprising instructions for generating synthetic data which, when executed by a computer, cause a computer processor to:

obtain a plurality of field value data and associated field labels for a chosen type of form document from an electronic data source;

classify the plurality of field value data into a plurality of data categories, wherein the plurality of data categories comprises at least one from a group consisting of personally identifiable information, categorical data, and continuous data;

learn statistical data distributions for categorical and numerical data types using the classified categorical and numerical data;

sample data elements randomly using the learned data distributions to generate synthetic data for categorical and numerical data;

assemble the synthetic data for the plurality of data categories with the associated field labels to generate a labeled synthetic textual data set;

render the labeled synthetic textual data set over a structured form layout image to produce a synthetic form image by:
  obtaining synthetic textual datasets from a data assembler;
  obtaining the structured form layout image;
  choosing random available text fonts and styles from a library of available text fonts; and rendering the labeled synthetic textual data set over the structured form layout image using an image rendering engine to produce the synthetic form image; and store the synthetic form image and the labeled synthetic textual data set for future use as training data for machine learning algorithms.

20. The non-transitory computer readable medium of claim 19, wherein the synthetic form image and the labeled synthetic textual data set is stored for future use as training data for machine learning algorithms.

\* \* \* \* \*